United States Patent [19]

Oostenbrink et al.

[11] 4,441,744

[45] Apr. 10, 1984

[54] BRANCH PIPE PART

[75] Inventors: Albertus A. Oostenbrink, Hardenberg; Anno G. Negen, Ommen; Marinus L. G. van Kaam, Leimuiden, all of Netherlands

[73] Assignee: Wavin B.V., Zivolle, Netherlands

[21] Appl. No.: 331,577

[22] Filed: Dec. 17, 1981

[30] Foreign Application Priority Data

Dec. 18, 1980 [NL] Netherlands ................... 8006882

[51] Int. Cl.³ ............... F16L 41/00; F16L 55/00; F16L 21/00
[52] U.S. Cl. .................. 285/162; 285/27; 285/197; 285/DIG. 11; 285/DIG. 22; 285/403; 277/207 A
[58] Field of Search ........... 285/162, 403, 220, 212, 285/27, DIG. 22, 197, DIG. 11; 277/207 A

[56] References Cited

U.S. PATENT DOCUMENTS

| | | | |
|---|---|---|---|
| 3,542,980 | 11/1970 | Hamilton | 285/162 X |
| 3,892,169 | 7/1975 | Jarnot | 285/162 X |
| 4,073,513 | 2/1978 | Blakeley | 285/197 |
| 4,174,859 | 11/1979 | Houghton | 285/DIG. 22 |
| 4,211,438 | 7/1980 | Asberg | 285/DIG. 22 |
| 4,234,218 | 11/1980 | Rogers | 285/162 |
| 4,313,627 | 2/1982 | de Lange | |

FOREIGN PATENT DOCUMENTS

| | | | |
|---|---|---|---|
| 267976 | 1/1969 | Austria | 277/207 A |
| 2340792 | 2/1974 | Fed. Rep. of Germany | 285/DIG. 22 |
| 1384638 | 11/1964 | France | 285/DIG. 22 |
| 1470117 | 1/1967 | France | |
| 2195768 | 3/1974 | France | |
| 1313069 | 4/1973 | United Kingdom | |

Primary Examiner—Richard J. Scanlan, Jr.
Attorney, Agent, or Firm—Wilkinson, Mawhinney & Theibault

[57] ABSTRACT

A branch pipe part is provided with a collar and a downwardly extending skirt, the free end of the branch pipe part comprising a first outwardly extending projection and the lower portion of said pipe part being provided with longitudinal incisions allowing deformation of said lower portion.

The outer wall of the space formed by collar and skirt may have apertures for passing a lip of a sealing member. In order to avoid further deformation of the lower portion with incisions after connection with a main conduit, a deformation-preventing bush is pushed into the lower portion and locked by means of a cam.

For decreasing the distance between the outer side of a main conduit connected with the branch pipe part, the skirt may be provided with a removable adapting ring, an intermediate part thereof decreasing the distance between the outer side of the main conduit and the free lower end of the skirt. The lower free end or the bottom side of the intermediate part and the outer side of the main conduit tightly engage a part of the sealing member, said sealing member comprising four legs.

6 Claims, 9 Drawing Figures

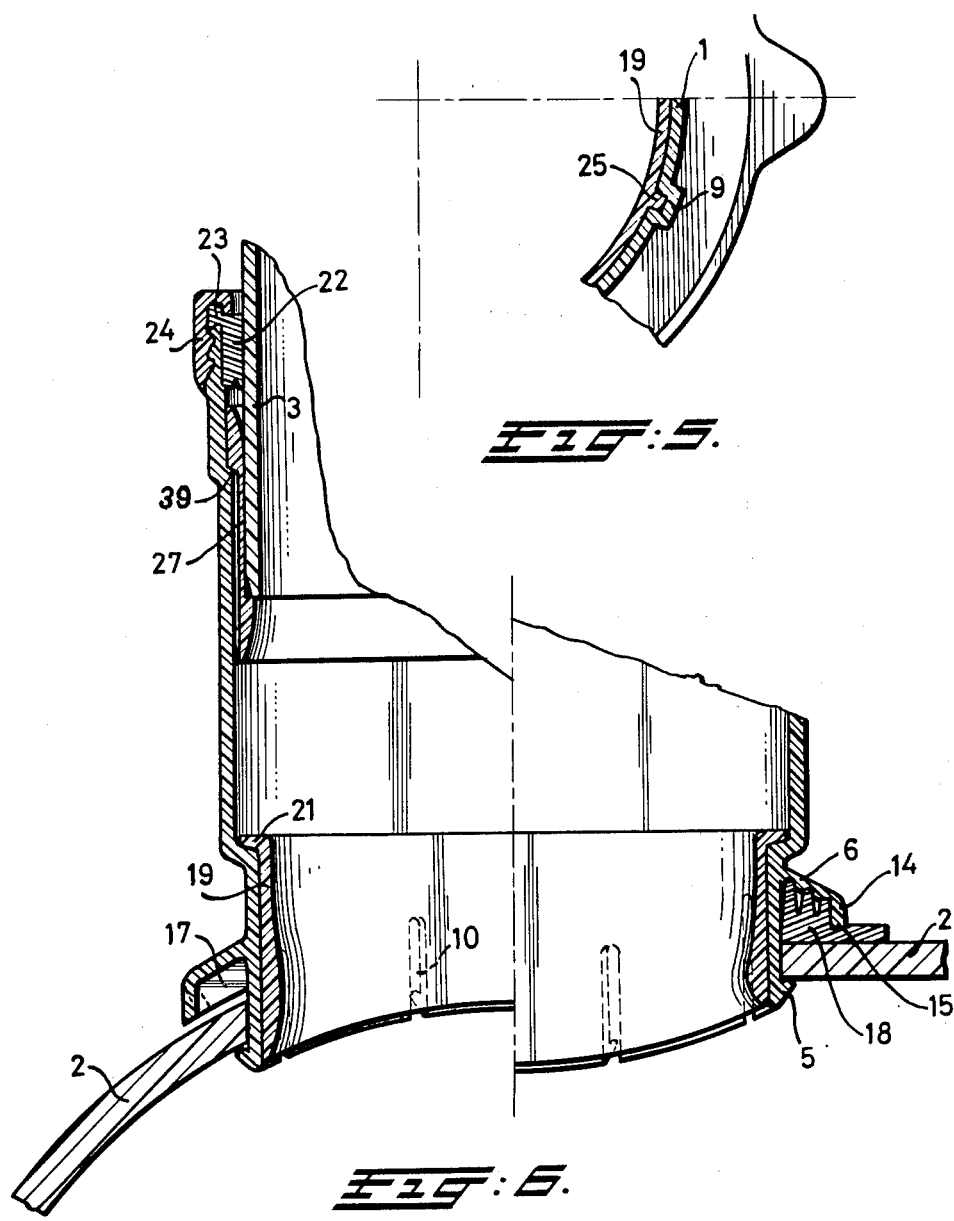

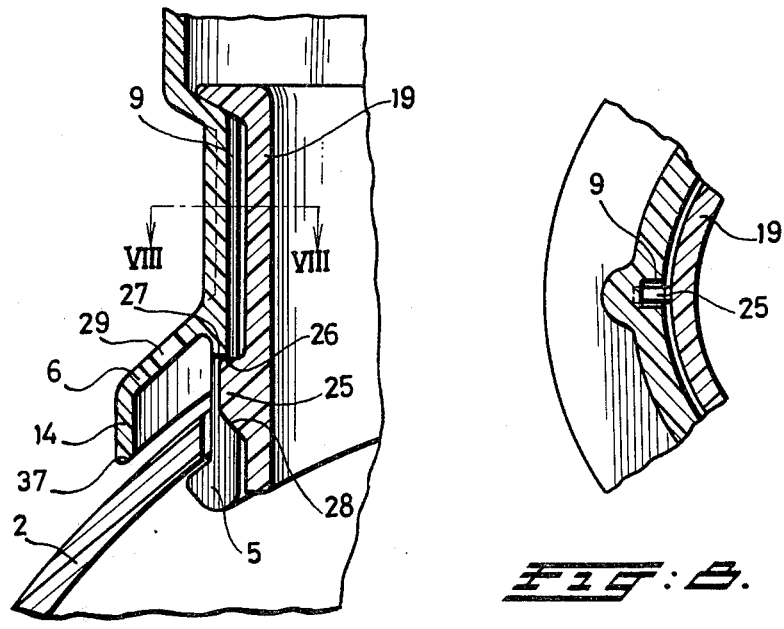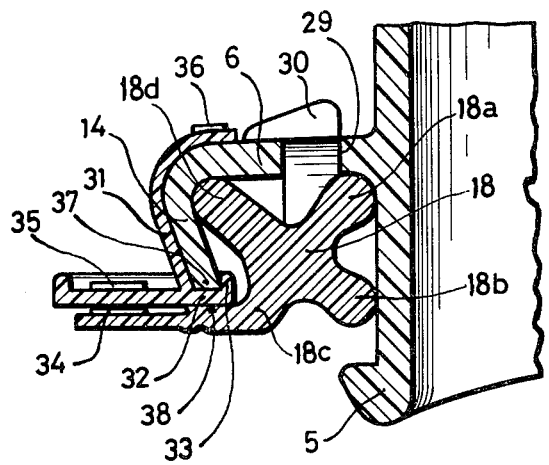

BRANCH PIPE PART

BACKGROUND OF THE INVENTION

1. Field of the Invention

The present invention relates to a branch pipe part, more particularly a plastic branch pipe part for connecting a supply or discharge conduit to a main conduit, the lower end of said branch pipe part to be inserted into an opening of a main conduit, at least comprising a first outwardly extending projection and an annular space for receiving an annular sealing member.

2. Description of the Prior Art

A branch pipe part of this type has been used in the art. Said known branch pipe part has the drawback that the construction of the same is complicated and that narrow tolerances have to be maintained as regards the opening to be formed in the main conduit, whilst furthermore, said branch pipe parts are insufficiently resistant to transverse forces and bending forces executed upon them.

SUMMARY OF THE INVENTION

With a view to the state of the art it is a primary object of the present invention to provide a branch pipe part which does not have said drawbacks.

This object is attained according to the invention in that the lower portion of the branch pipe part to be inserted into a main conduit, is constructed in a deformable manner.

This measure eliminates the necessity of maintaining narrow tolerances for the opening to be made in the main conduit and ensures on the other hand an optimum sealing between said main conduit and the branch pipe part.

A reliable connection between a branch pipe part, more particularly a plastic branch pipe part, and a main conduit is obtained by pushing a deformation-preventing bush into the branch pipe part after mounting. This bush prevents a substantial further deformation of the deformable part so that the first outwardly extending projection is locked in the main conduit.

A good instalment of a bush of said type in the branch pipe part, is ensured by providing one side of said bush with a collar, engaging an abutment edge in the branch pipe part when said bush has been pushed into said branch pipe part, the latter advantageously being provided with a positioning member, e.g. in the form of a groove, which may cooperate with a positioning member part of the bush, e.g. in the form of a cam; obviously the branch pipe part may be provided with a cam and the bush with a groove. The annular abutment edge allows an instalment of the bush in the branch pipe part at the appropriate height, the respective groove and cam effecting an appropriate position of the bush in the branch pipe part.

The branch pipe part according to the present invention, advantageously comprises incisions in order to obtain a deformable portion, said incisions preferably being longitudinal incisions.

The branch pipe part according to the invention is advantageously provided with an annular collar, in order to maintain an annular sealing member between the outer side of the main conduit and the respective collar.

An optimum seal to be obtained by means of a simple sealing ring, is effected by advantageously providing the annular collar with a downwardly extending skirt, thus forming a securing groove into which the sealing ring may be enclosed. The presence of a securing groove allows a flat sealing ring to be retained in a curved plane, corresponding to the outer wall of the main conduit with respect to the branch pipe part.

An extremely important advantage can further be attained by combining the respective branch pipe part according to the present invention with an element as known from Netherlands Patent Application No. 78,03400. The distance between a main conduit and a road surface may then be restricted considerably, as in that case only the height of the branch pipe part is required. This is of great importance in separated sewer systems in which rain water is mostly discharged through a separate main conduit located in the vicinity of the road surface.

The features of the present invention which are believed to be novel are set forth with particularity in the appended claims.

Other claims and many of the attendant advantages will be more readily appreciated as the same becomes better understood by reference to the following detailed description and considered in connection with the accompanying drawings, in which like reference symbols designate like parts throughout the figures.

DESCRIPTION OF THE DRAWINGS

FIG. 5 is a detail of a branch pipe part comprising a longitudinal groove engaging a centering cam of a stiffening bush;

FIG. 6 is a modified embodiment of a branch pipe part according to the present invention, comprising a member for compensating compression of the ground;

FIG. 7 is another embodiment of a branch pipe according to the invention;

FIG. 8 is a section through line VIII—VIII and

FIG. 9 is a detail of still another embodiment of a branch pipe part according to the invention.

DESCRIPTION OF THE PREFERRED EMBODIMENTS

Figure 1:
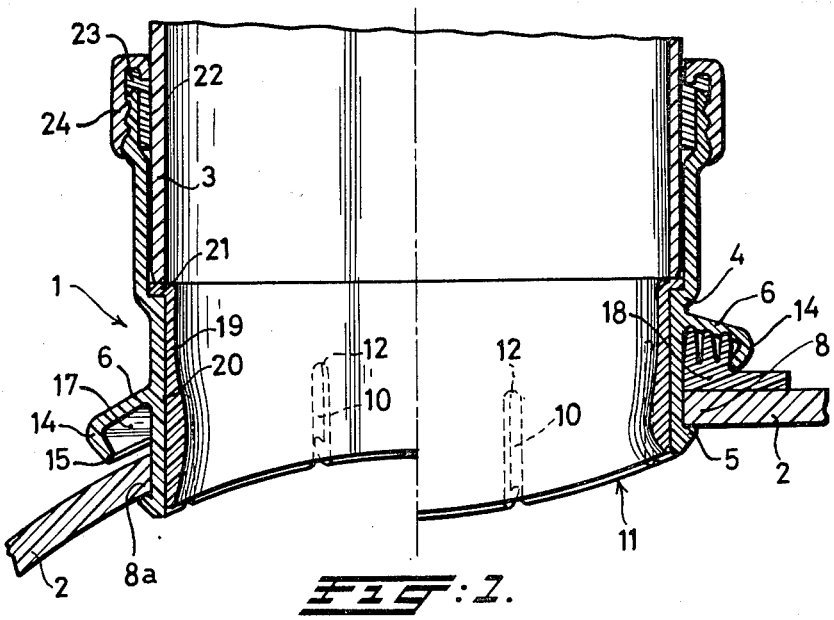
FIG. 1 is a first embodiment of a branch pipe part according to the invention.

Referring now to FIG. 1 a branch pipe part 1 is illustrated for connecting a main pipe conduit 2 to a branch conduit 3. The inner side of said branch pipe part comprises an abutment edge 4 and the outer side of said branch pipe part is provided with a projection 5 in the form of a collar, at its free extremity 11. At distance from and on a higher level than the free extremity 11, an outer circular collar 6 is provided. The space between projection 5 and circular collar 6 is adapted to receive the wall of a main conduit 2 and an annular sealing member 18. Longitudinal incisions 10 in the branch pipe part 1 allow the lower side of said branch pipe part to become deformable, so that the outwardly extending projection 5 is able to pass the edge 8 of an opening in the main conduit 2. Said longitudinal incisions 10 extend from the free extremity 11 of the branch pipe part 1 to a region 12, situated at a level lower than the circular collar 6. Said circular collar 6 comprises a downwardly extending skirt 14 which may preferably be provided with an inwardly directed skirt projection 15.

Figure 2:
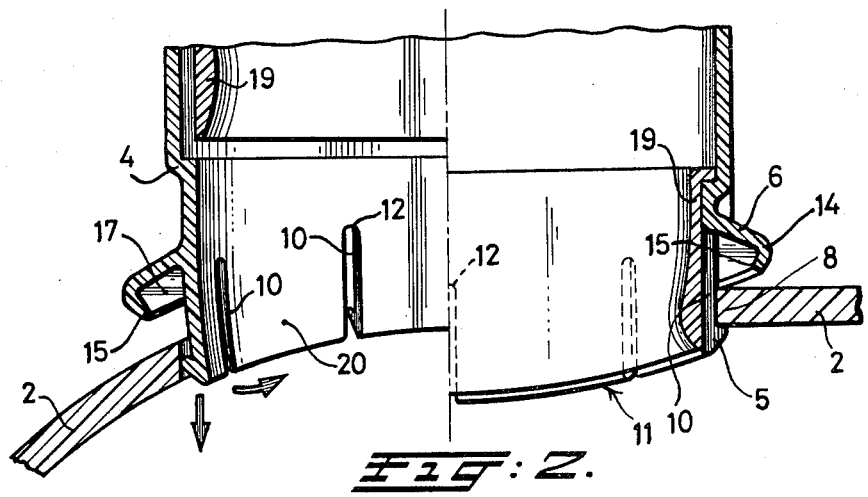
FIG. 2 is a part of a branch pipe part of FIG. 1, however, partly in an unmounted manner.
Figure 3:
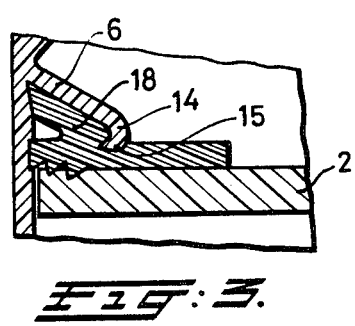
FIG. 3 is a detail of mounting an annular sealing member in a branch pipe part according to the present invention.

Referring now to FIG. 2 an annular sealing member 18 may be installed in a recess bounded by the skirt 14 and the circular collar 6 (see also FIGS. 1 and 3); said sealing member 18 may be provided with projecting ribs.

Figure 4:
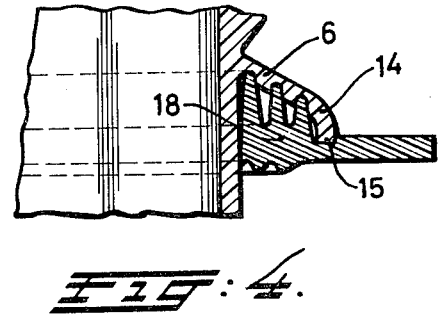
FIG. 4 is a modified embodiment of the detail of FIG. 3.

Referring now to FIG. 4 in a modified embodiment of a sealing member 18 the inwardly directed skirt projection 15 for appropriately retaining the annular sealing member 18, is now not present. An undesired deformation of the deformable end portion of the branch pipe part 1, causing said branch pipe part to be displaced after having passed into the opening in the main conduit via projection 5, is avoided by pushing a bush 19 into the inner side of the branch pipe part, the outer side of said bush engaging the inner side 20 of the branch pipe part, thus substantially avoiding any deformation of the respective end portion and ensuring an optimum connection of the main pipe conduit 2 to the branch pipe part (FIGS. 1 and 2).

Said bush 19 preferably comprises a shoulder 21 engaging the abutment edge 4, when being slid into the branch pipe part, so that the sliding distance of the deformation avoiding bush 19 is limited (FIG. 1).

Referring now to FIG. 5, bush 19 comprises a cam 25 in the form of a positioning member part engaging a groove 9 in the form of a positioning member, provided in branch pipe part 1. In this manner an incorrect positioning of bush 19 in the branch pipe part 1 is prevented. Obviously, said cam 25 may also be provided upon the branch pipe part 1, while groove 9 will then be provided upon the bush 19. The position of branch line 3 is also bounded by the abutment edge 4 or by the projecting shoulder 21, which engages said abutment edge 4 (FIG. 1).

Referring now to FIG. 6 in a modified embodiment of the branch pipe part according to the present invention, an additional abutment edge 26 is provided at a socket end of said branch pipe part, a stretchable bush 27 as described in Netherlands Patent Application No. 78,03400 resting against said additional abutment edge 26.

On executing axial forces upon the branch line 3, the stretchable bush 27 of a polyolefin, such as polyethylene or polypropylene, will yield, so that the branch conduit, notwithstanding any ground shifts, will not be impaired. A shoulder 21 bounds the axial displacement of the branch line 3.

Advantageously a sealing sleeve 22 is used in order to simply fix branch line 3, the front end 23 of said sealing sleeve being retained by a retaining ring 24, which is fastened in an axial displaceable way upon the outer side of the branch pipe part 1.

Due to the obliquely extending upper surface of the circular first outwardly extending projection 5, the latter comprises a slightly engaging upper edge 8a, which additionally prevents an undesired displacement of the branch pipe part 1 (see FIG. 1).

Referring now to FIG. 7 an embodiment is illustrated out of which, after instalment, the bush 19 cannot be pulled as the upper edge 26 of cam 25 is hooked behind the end edge 27 of an incision 10. In order to move the cam 25 into an incision 10 and to hook the cam behind the end edge 27, the height of the cam is greater than the depth of the groove 9 and the lower edge 28 of said cam 25 is chamfered.

Referring now to FIG. 9 in order to retain a sealing ring 18 in annular space 17, particularly if the skirt 14 extends parallel to the branch piece, the sealing ring may be provided with lips 30 extending through apertures 29 in collar 6. These lips 30 retain the sealing ring 18 in space 17.

For an improved sealing it may be advantageous to provide the sealing member 18 with sealing member legs 18a, 18b, 18c and 18d.

As one branch piece has to be used for main pipes of different wall thicknesses it may be advantageous to mount an adapting ring 31 around skirt 14, which ring 31 may press the skirt 14 inwardly. If a main pipe of a greater wall thickness has to be connected with the branch piece, the adapting ring 31 is removed.

The adapting ring 31, preferably of a polyolefin, such as polypropylene, is provided with at least one label 35, for indicating the class of the main pipe 2, in case of using the branch piece with the adapting ring 31.

At least one label 36 of adapting ring 31 provides the information for removing the adapting ring 31, an label 34 of the rubber sealing member 18 providing information about the class of pipe to be used with the branch piece after removal of adapting ring 31.

For improving the sealing the adapting ring 31 comprises an intermediate part 32 engaging the lower free end 37 of skirt 14, said intermediate part having an upstanding inner edge 33 engaging the inner side of the skirt 14. A leg 18c of sealing member 18 engages the intermediate part 32.

In this sealing member the fixation and partly the sealing, is obtained by the upper legs 18a and 18d of sealing member 18, which legs are deformed in a horizontal plane.

The leg 18b is also deformed in a horizontal plane and the last leg 18c is always tightly engaging the outer side of the main pipe conduit 2 and either the lower free end of skirt 14 or the bottom side 38 of the intermediate part 32 of the compressing ring 31.

A very preferred embodiment as shown in FIG. 7 is combined with an appropriate adapting ring 31 and a sealing member 18 with lips 30, as shown in FIG. 9.

The branch piece consists preferably of a thermoplastic such as polyvinylchloride.

Although the present invention has been shown and described in connection with a preferred embodiment thereof, it will be apparent to those skilled in the art that many variations and modifications may be made without departing from the invention in its broader aspects. It is therefore intended to have the appended claims cover all such variations and modifications as fall within the true spirit and scope of the invention.

What is claimed is:

1. A plastic branch pipe part for connecting a discharge conduit to a main conduit, the lower end of said branch pipe part to be inserted into an opening of a main conduit comprising a first outwardly extending projection part forming with the outer side of the branch pipe an annular space for receiving an annular sealing member, the lower portion (11) of said branch pipe part being provided with lock means (5) to be inserted and locked into a main conduit (2) and having an incision (10) to allow said portion to be deformable and being provided with a positioning member (9) in the form of a groove, a bush (19) having a positioning member portion (25) in the form of a cam slidably installed in said groove in said lower portion of said branch pipe part (1) and hooking behind an end edge (27) of said incision (10), said cam being guided in said groove (9) of the branch pipe part, said bush obviating any deformation of the lower part 11 of the branch pipe part to be inserted into a main conduit.

2. A plastic branch pipe part as claimed in claim 1 further comprising an additional edge (39) against which an axially yieldable bush (27) may rest.

3. A plastic branch pipe part connecting a discharge conduit to a main conduit, the lower end of said branch pipe part inserted into an opening of a main conduit comprising a first outwardly extending projection part (6) with a downwardly extending skirt (14) forming with the outer side of the branch pipe an annular space 17 receiving an annular sealing member 18 the lower portion (11) of said branch pipe part being provided with lock means (5) inserted and locked into said main conduit (2) and having incisions (10) to allow said portion to be deformable and being provided with a positioning member (9) in the form of a groove, a bush (19) having a positioning member portion (25) in the form of a cam slidably installed in said groove, said cam having a bush locking means hooking behind an end edge (27) of an incision (10), said cam being guided in the groove (9) of the branch pipe part.

4. The branch pipe part of claim 3, including a removable adapting ring (31) having an intermediate part (32) engaging the free end (37) of said skirt (14) for compensating spatial differences between the outer side of main conduit (2) and the lower free end (37) of skirt (14).

5. The branch pipe part of claim 4, wherein a part of said sealing member (18) tightly engages the outer side of the main conduit (2) and the bottom side (38) of the intermediate part (32) of said adapting ring (31).

6. The branch pipe part of claim 3, wherein said outwardly extending projection (6) is provided with at least one aperture (29), said sealing member (18) having a lip (30), said aperture (29) allowing passage of said lip (30) to retain said sealing member (18).

* * * * *